US006935469B2

(12) United States Patent
Bourlon

(10) Patent No.: US 6,935,469 B2
(45) Date of Patent: Aug. 30, 2005

(54) ASSEMBLY WITH BALL-JOINT CONNECTION FOR A MASTER CYLINDER EQUIPPED WITH SUCH AN ASSEMBLY, AND METHOD OF ASSEMBLING SUCH AN ASSEMBLY

(75) Inventor: Philippe Bourlon, Dammartin en Goele (FR)

(73) Assignee: Robert Bosch GmbH, Stuttgart (DE)

( * ) Notice: Subject to any disclaimer, the term of this patent is extended or adjusted under 35 U.S.C. 154(b) by 47 days.

(21) Appl. No.: 10/760,842

(22) Filed: Jan. 20, 2004

(65) Prior Publication Data

US 2004/0159508 A1 Aug. 19, 2004

(51) Int. Cl.[7] .......................... B60T 11/18; F16C 11/06

(52) U.S. Cl. ....................... 188/152; 403/123; 403/131; 92/128; 92/129

(58) Field of Search ............................ 188/151 R, 152, 188/355, 356, 357, 358, 359, 360; 303/113.3, 114.1, 114.2, 114.3; 92/84, 128, 129; 403/76, 90, 101, 122, 123, 128, 129, 130, 131, 133, 135, 136, 315, 316

(56) References Cited

U.S. PATENT DOCUMENTS

| | | | | | |
|---|---|---|---|---|---|
| 2,856,250 | A | * | 10/1958 | Johannes | 403/144 |
| 3,013,537 | A | * | 12/1961 | Schultz | 92/129 |
| 4,650,363 | A | * | 3/1987 | Kehl et al. | 403/135 |
| 5,143,469 | A | * | 9/1992 | Cadeddu | 403/133 |
| 5,153,976 | A | * | 10/1992 | Benchaar et al. | 403/135 |
| 5,290,120 | A | * | 3/1994 | Osterfeld et al. | 403/133 |
| 5,499,570 | A | * | 3/1996 | Bergelin et al. | 403/133 |
| 6,135,575 | A | * | 10/2000 | Feigel et al. | 303/114.1 |

* cited by examiner

*Primary Examiner*—Thomas Williams

(57) ABSTRACT

A ball-joint connection for a braking system comprising a male element (2) and a female element (4). A first end (14) of the male element (2) includes pegs (30,30') that are automatically radially extracted when the first end (14) is mounted in a female element (4) defined by a housing (16). The pegs (30,30') collaborate with the interior surface (18) of the housing (16,66) to define a ball-joint connection between the male element (2) and the female element (4). The female element (4) being formed on one end of a piston (66) of for a master cylinder and the male element (2) forms the actuating rod of the master cylinder.

11 Claims, 3 Drawing Sheets

ASSEMBLY WITH BALL-JOINT CONNECTION FOR A MASTER CYLINDER EQUIPPED WITH SUCH AN ASSEMBLY, AND METHOD OF ASSEMBLING SUCH AN ASSEMBLY

BACKGROUND OF THE INVENTION

The present invention relates mainly to an assembly with a balljoint connection, to a master cylinder equipped with such an assembly, and to a method of assembling such an assembly.

In the field of automotive vehicle braking, particularly the field of electrohydraulic braking, it is necessary to connect, without play and very reliably, an actuating rod connected to a brake pedal moved by the driver of the motor vehicle, with a pressure emitter, for example a master cylinder connected to brakes arranged at the wheels of the motor vehicle.

It is known practice to make this connection by snap-fastening a second end of the actuating rod, at the opposite end to the first end which is connected to the brake pedal, into a female part formed of a blind bore made in a primary piston of the master cylinder, the snap-fastening being achieved using a ring that is elastic radially and has a diameter at rest that is smaller than the outside diameter of the second end of the push rod, the ring being mounted fixedly and without play in the body of the piston.

This snap-fastening device provides a reliable connection between the actuating rod and the primary piston, and in addition allows for rapid, simple and automatic attachment of the actuating rod to the primary piston. However, it entails mounting the radially elastic ring in the bore of the primary piston beforehand, and this may prove to be fairly lengthy to perform, even using mechanized arrangements.

SUMMARY OF THE INVENTION

It is therefore an object of the present invention to offer an assembly with a ball-joint connection that is very safe and simple and quick to perform.

Another object of the present invention is to offer an assembly with a ball-joint connection that can readily be adapted to suit existing master cylinders.

These objects are achieved by an assembly comprising a male element and a female element, the male element comprising a locking arrangement that collaborates with the female element and formed of elements that can be extracted radially as the male element is mounted in the female element.

In other words, the female element is formed of a blind bore blocked off at one end by an end wall and forming a striker, the male element comprising a key and at least one latch, the latch collaborating with the striker at the time of assembly, the latch being moved by a key that presses against the end wall of the female part.

The main subject of the present invention is an assembly with ball-joint connection comprising a female element pierced with a bore of longitudinal axis, equipped at a longitudinal first end with an end wall in which there is made a roughly spherical housing of inside diameter greater than the diameter of said bore and, at a longitudinal second end an opening allowing a male element to be introduced, the male element being formed of a rod equipped with a spherical first longitudinal end able to enter said bore and of a transverse dimension smaller than the diameter of the spherical housing, characterized in that said first end of the male element has components that form a ball-joint connection between the male element and the female element and in that the male element and the female element lock together in the assembled position.

Another subject of the present invention is an assembly with ball-joint connection that can be automatically extracted radially as a first end of the male element that is mounted in the housing of the female element.

Another subject of the present invention is an assembly with ball-joint connection wherein at least one first and one second pegs are mounted to slide in a diametral bore roughly orthogonal to the longitudinal axis and opening to both sides of the first end of the male element, a spacer element mounted to slide in an axial bore intercepting the diametral bore at a first end and opening to the outside of the male element at a second end, and in that prior to assembly of the male element and of the female element, the pegs are in a position of minimum separation from the longitudinal axis, termed the retracted position, and after assembly of the male element and of the female element, the spacer element spaces the pegs apart into a position of maximum separation termed the deployed position.

Another subject of the present invention is an assembly with ball-joint connection, characterized in that the spacer element is interposed between the first ends of the first and second pegs, in that the periphery of the spacer element is shaped as a ramp along the longitudinal axis, the ramp increasing in size in the direction from the first end of the spacer element, and in that a first end of the spacer element projects, prior to assembly, from the exterior surface of the spherical first end so that the spacer element is moved axially by the pressing of said longitudinal first end of the spacer element against the interior surface of the housing as the male element is introduced into the female element.

Another subject of the present invention is an assembly with a ball-joint connection, characterized in that the ramp has at least a smaller-diameter first cylindrical portion and a larger-diameter second cylindrical portion, said smaller-diameter set first portion being arranged between the first ends of the pegs prior to assembly of the male element and of the female element, and said larger-diameter second portion being arranged between the first ends of the pegs after assembly of the male element and of the female element, and in that a cone frustum connects the first portion to the second portion.

Another subject of the present invention is an assembly with ball-joint connection, characterized in that the spacer element has a substantially conical shape.

Another subject of the present invention is an assembly with ball-joint connection, characterized in that the first end of the pegs is substantially flat and a second end of the pegs is formed by a spherical cup of radius substantially equal to the interior radius of the housing of the female element.

Another subject of the present invention is an assembly with ball-joint connection, characterized in that the pegs are held in the position of minimum separation by retaining arrangement.

Another subject of the present invention is an assembly with ball-joint connection, characterized in that a retaining arrangement is formed of an elastic ring mounted in grooves made in the spherical end of the pegs and in an annular groove connecting the ends of the diametral bore.

Another subject of the present invention is an assembly with ball-joint connection includes a passage allowing a tool to simultaneously move the spacer element axially toward the end wall of the housing and move the male element axially toward the second end of the longitudinal bore of the female element so that the pegs readopt their retracted position.

Another subject of the present invention is an assembly with ball-joint connection, characterized in that the passage is made axially in the male element by extending the bore that accommodates the spacer element.

Another subject of the present invention is an assembly with ball-joint connection, characterized in that the passage is made in the end wall of the spherical housing of the female element facing the longitudinal first end of the spacer element.

Another subject of the present invention is a master cylinder for a braking system comprising a body pierced with a bore in which there is mounted to slide at least one piston connected by a ball-joint connection to an actuating rod connected to a brake pedal, the piston delimiting a supply chamber connected to a reservoir of brake fluid and a pressure chamber connected to brakes F arranged at the wheel R, the pressure and supply chambers being in communication at rest and isolated from one another under a braking action, characterized in that it comprises an assembly with ball-joint connection according to the present invention, the male element forming an end of the piston and the female element forming the actuating rod.

Another subject of the present invention is a master cylinder, characterized in that the pressure chamber is connected under normal operation to a cartridge for simulating the pedal feel and in degraded operation is connected to the brakes.

Another subject of the present invention is a method for assembling an assembly with a ball-joint connection according to the present invention, characterized in that:

the pegs are mounted in the diametral bore of the male element and the spacer element is mounted in the longitudinal bore of the male element in such a way that the pegs are in their position of minimum separation; and the male element is introduced into the female element until the first end of the male element comes into contact with the wall of the housing of the female element such that the spacer element is pushed back inside the longitudinal bore of the male element and brings the pegs into their position of maximum separation and the spherical ends of the pegs then collaborating with the interior surface of the housing of the female element.

The present invention will be better understood with the aid of the description which will follow and of the attached drawings in which the front and the rear correspond respectively to the left and to the right in the figures.

DETAILED DESCRIPTION OF THE INVENTION

Figure 2:
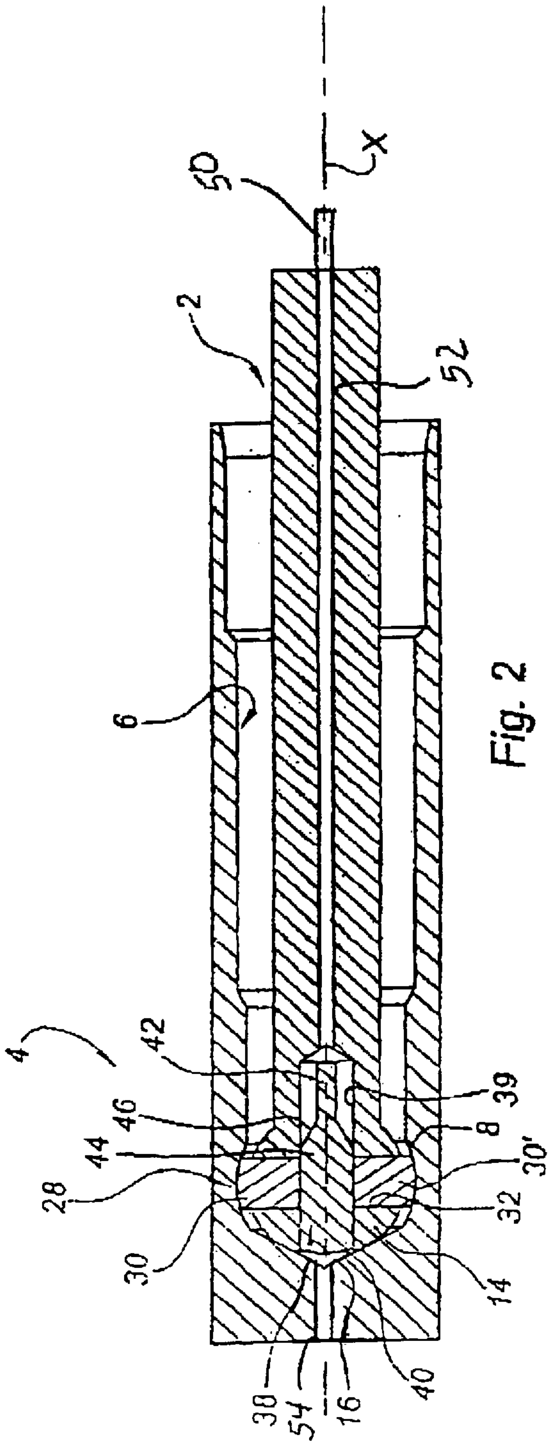
FIG. 2 is a view in longitudinal section of FIG. 1 in a second position.
Figure 1:
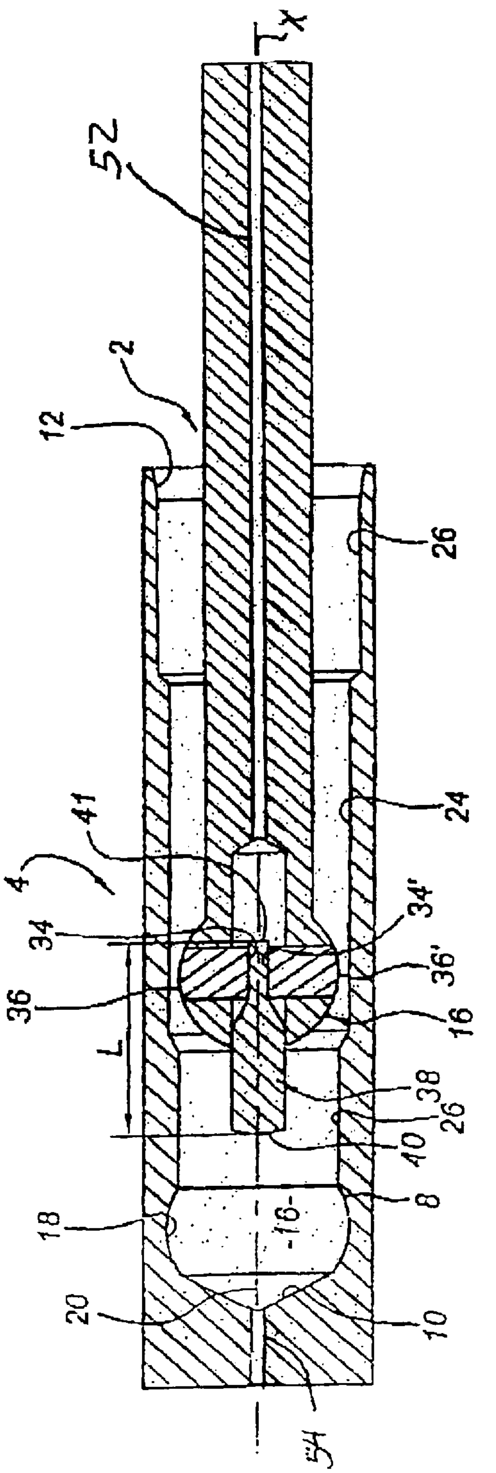
FIG. 1 is a view in longitudinal section of a first exemplary embodiment of an assembly with a ball-joint connection according to the present invention, in a first position.

FIGS. 1 and 2 show an assembly with a ball-joint connection according to the present invention comprising a male element 2 and a female element 4, the male element 2 being for example formed of a longitudinal first end of an actuating rod of a braking device, at the opposite end to a second end that is connected to a brake pedal, and the female element 4 being, for example, formed by a shank of a primary piston of a master cylinder.

The female element 4 comprises a substantially cylindrical bore 6 of longitudinal axis X opening at a longitudinal first end 8 into a substantially spherical housing 16 with a diameter greater than the diameter of the bore 6, and open at a longitudinal second end 12, at the opposite end to the first end 8 to allow the fitting of a longitudinal first end 14 of the male element 2. The housing 16 is delimited by an end wall 10. The inside diameter of the bore 6 is greater than the transverse dimensions of the first end 14 of the male element prior to assembly.

In the example depicted, the first end 14 of the male element is of spherical shape.

In the example depicted, the housing 16 has a first part 18 that is substantially toric and coaxial with the axis of the bore 6, and a second part 20 that is conical and made in the end wall 10 of the bore that is coaxial with the axis X.

Advantageously, the inside diameter of the bore narrows from the second end 8 of the bore to the housing 16 so as to form a funnel to guide the male component 2. In the example depicted, the bore 6 has a first 22, a second 24 and a third 26 cylindrical portion, the diameter of the first portion 22 being smaller than the diameter of the second portion 24 and the diameter of the third portion 24 being smaller than the diameter of the second portion 26 and than the diameter of the housing 16.

The male element also comprises a connecting components 28 for the ball-joint connection of the male element to the female element these means being borne by the longitudinal first end 14 of the male element.

The connecting means 28 comprise at least a first and a second pegs 30, 30' mounted to slide in a bore 32 made in the end 14 along a diameter of the end 14 in a direction substantially orthogonal to the axis X, the bore 32 opening onto each side of the end 14. The pegs 30, 30' respectively comprise radially internal first ends 34, 34' and radially external second ends 36, 36' each opposite the respective first end. The pegs 30, 30' are arranged in the bore 32 in such a way that the first ends 34, 34' are mounted facing each other.

The second ends 36, 36' are advantageously formed by a spherical cap, the spherical cap 36, 36' having a radius substantially equal to the interior radius of the toric part 18 so as to allow a substantially surface contact between the cap and the torus.

In the example depicted, the first ends 34, 34' are formed by flat surfaces:

Of course, the connecting means 28 could comprise more than one pair of pegs, for example 2 or 3 pairs.

Prior to assembly of the male element 2 and of the female element 4, the first ends 34, 34' of the pegs 30, 30' are in a position of minimum separation termed the retracted position, the spherical caps 36, 36' therefore do not project from the surface of the spherical first end 14 of the male element.

After the male element 2 and female element 4 have been assembled, the first ends 34, 34' are in a position of maximum separation termed the deployed position, the spherical caps 36, 36' then projecting from the exterior surface of the first end 14 of the male element. As the diameter of the housing 16 is greater than the diameter of the portion of bore 26, when the pegs 30, 30' are in the deployed position, the male element is held in the housing 16.

The means 28 also comprise a spacer element 38 arranged between the flat first ends 34, 34' thus ensuring, prior to assembly of the male element and of the female element, the position of minimum separation between the pegs and ensuring, after assembly, the position of maximum separation between the pegs 30, 30'.

The spacer element 38 has substantially the shape of a shuttle mounted to slide in the bore 39 of axis X made in the spherical end of the male element of opening at a longitudinal first end into the housing 16 of the female element and at a longitudinal second end into the diametral bore 32.

The shuttle has an axial dimension L long enough for a first axial end 40 of the shuttle to project from the axial first end 14 of the male element while at the same time a second axial end 41 of the shuttle is interposed between the pegs 30 and 30' along the axis X.

The axial bore 39 is also dimensioned to allow the first end 40 of the shuttle to enter the bore 39 so that the latter no longer projects from the surface of the end 14 of the male element.

The periphery of the spacer element or shuttle 38 has a ramp having a frustum conical shape 46 that ascends toward the longitudinal first end 40, the ramp comprises, in the example depicted, a smaller-diameter rear first part 42, ensuring the minimum separation, and a larger-diameter front second part 44, ensuring the maximum separation.

It is of course conceivable to produce the shuttle with a ramp ascending in continuous manner, for example in the form of a cone.

It is also possible to anticipate for the shuttle 38 to comprise only a conical part and a part ensuring the maximum separation of the pegs. Thus, the shuttle would interpose itself between the flat surfaces only at the time of assembly.

Considering the view in longitudinal section of a peg, the lateral side of a peg and the flat side of the ends 34, 34' meet in a circular arc to make it easier for the pegs and shuttle to slide relative to one another, and to reduce the risk of wear.

The axial dimensions of the various parts 42, 44, 46 of the shuttle and of the pegs 30, 30' are determined such that contact between the spherical caps and the interior surface of the toric part occurs when the spherical end comes into abutment against the wall of the housing 16 of the female element.

We shall now describe the various phases of the assembly of the male element in the female element.

The method of manufacture of the assembly according to the present invention mainly involves the following steps:

- placement of the shuttle 38 in the bore 39 and of the pegs 30, 30' in the bore 32, the smaller-diameter first part 42 of the shuttle being arranged between the first ends 34, 34' of the pegs 30, 30'; and
- introduction of the spherical end of the male element into the female element along the axis X until the first end 40 of the shuttle comes into contact with the wall of the housing 16, then until the pegs separate simultaneously from one another and their outer radial ends in the form of spherical caps 36, 36' come into contact with the wall of the housing 16. The connection between the male element and the female element is then permanent and the male element can then pivot in the female element by the sliding of the spherical ends 36, 36' of the pegs 30, 30' on the wall of the housing 16.

The assembly according to the present invention provides a high level of safety because of the locking-together of the male element and the female element. Indeed, the pegs apply a clamping force to the shuttle, which are themselves held pressed against the wall of the housing 14 by the larger-diameter portion of the shuttle which is held axially immobile by the end wall 10 of the housing 16 made in the female element.

It is also conceivable to size the axial bore 39 to avoid axial movement of the shuttle after assembly.

The assembly locks itself automatically and requires no additional component to be introduced into the female element, and as far as the placement of the pegs and of the shuttle is concerned, this is very simple.

It is possible to anticipate a need for unlocking the male element 2 and female element 4 assembly which could be achieved by placing a pin or tool 50 in an axial passage 52 in the male element 2 connecting the bore 39 to the outside to allow unlocking of the connection between the male element and the female element. The tool would push the shuttle forward and at the same time moves the male element 2 backward so as to allow the pegs 30, 30' to return to a position of minimum separation.

Likewise an opening 54 may be provided in the end wall 10 of the housing 16 facing the shuttle.

It is also advantageous to provide a way of holding the shuttle and the pegs in the retracted position to prevent these from inadvertently leaving their housings, for example by smearing a layer of grease between the lateral surface of the pegs and the surface of the radial bore. It is also possible to manufacture the shuttle and the pegs from a weakly magnetic material that holds the pegs and shuttle 38 in place.

Figure 3:
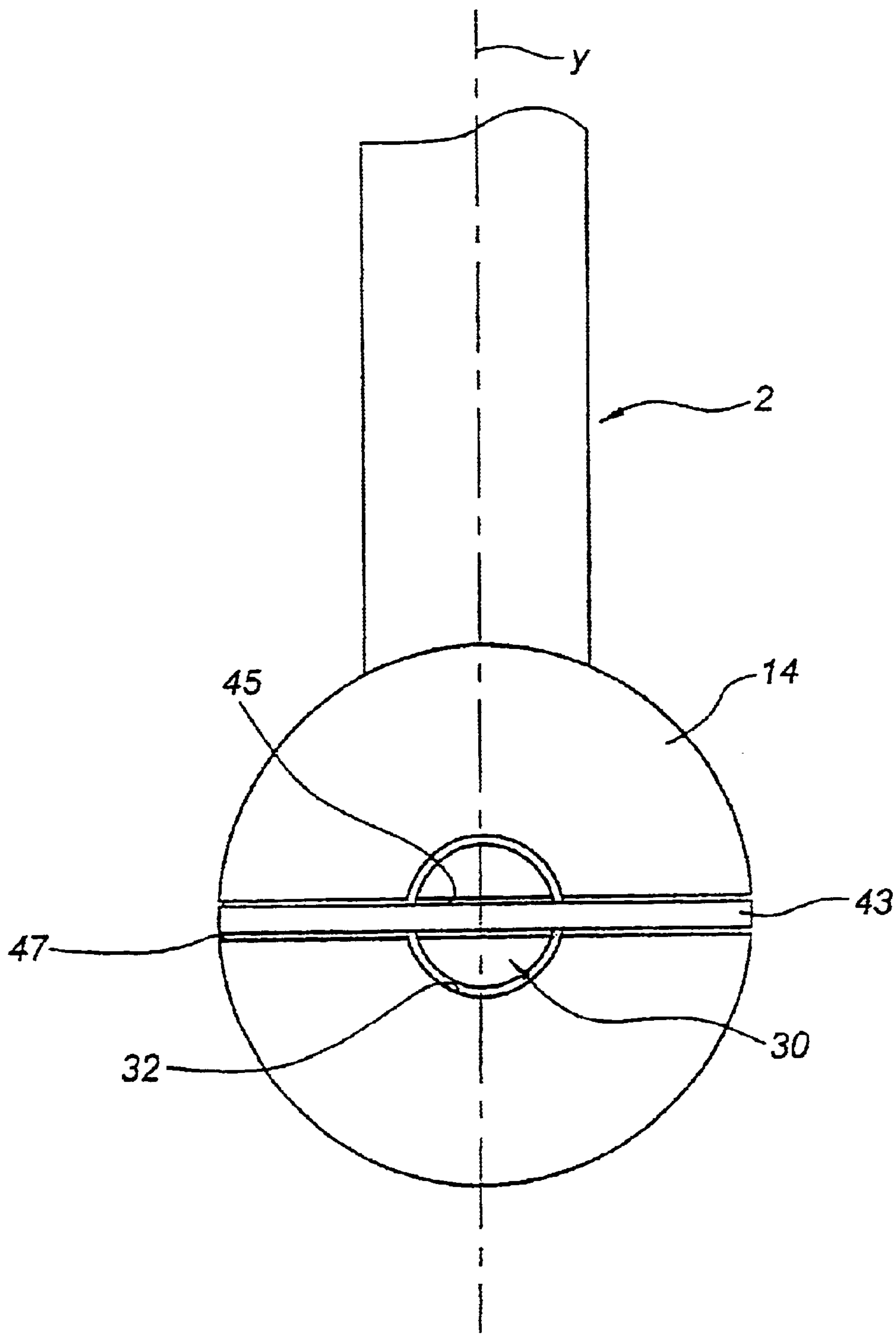
FIG. 3 is a view from above of a detail of a second exemplary embodiment of an assembly according to the present invention.
Figure 4:
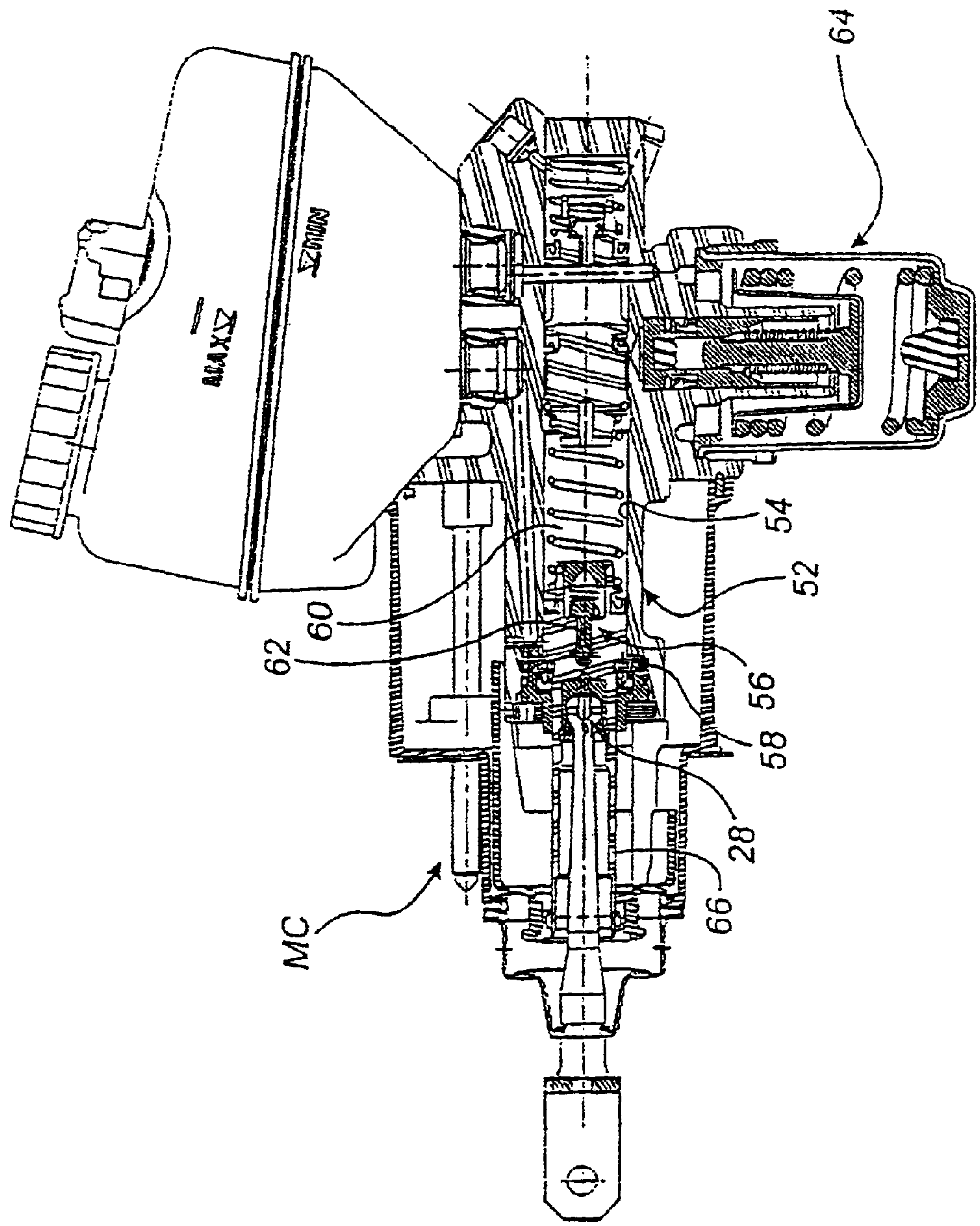
FIG. 4 is a view in longitudinal section of a master cylinder according to the present invention.

In FIG. 3, the connecting means 28 comprises two pegs distributed angularly and uniformly. The pegs are held in place prior to assembly inside the bores by means of an elastic ring 43 coaxial with the axis Y of the male element and mounted in grooves 45 made in the spherical caps 36, 34' of the pegs in a plane P orthogonal to the axis Y of the male element and in an annular groove 47 connecting the two ends of the bore 32 and also contained in the plane P. Thus, the elastic ring 43 applies an inward radial force to the pegs 30, 30' which are held in the position of minimum separation without impeding the pegs 30, 30' in coming into a position of maximum separation at the time of assembly.

There has indeed been produced an assembly with a ball-joint connection having a high level of safety, that is simple and quick to produce.

This assembly may be applied to any device requiring a play-free ball-joint connection, for example a master cylinder for a hydraulic braking circuit, a pneumatic brake booster or alternatively the damping struts on tailgates.

The present invention applies particularly to a master cylinder MC for an electrohydraulic braking system (FIG. 5) formed of a body 52 pierced with a bore 54 in which there is mounted to slide with sealing at least one piston 56, advantageously a first and a second piston 56 respectively delimiting a primary circuit and a secondary circuit which are connected to brakes F arranged at wheels R. The primary piston is actuated by a control rod connected to a brake pedal 55. Each of the circuits comprises a supply chamber 58 connected to a reservoir of brake fluid (not depicted) and a pressure chamber 60 connected to the brakes, the supply chamber and the pressure chamber being placed in communication at rest by a passage 62 made in the piston and isolated by a shutter 64 mounted in the passage 62.

The primary piston 56 comprises a piston shank 66 pierced with a blind bore and forming the female element of the assembly with balljoint connection according to the present invention and the male element is formed of the actuating rod connected to a brake pedal.

The pressure chambers 58 of the primary and secondary circuits are, under braking in normal operation, isolated from the brakes by electrically operated valves (not depicted) and the pressure chamber of the primary circuit is in communication with a cartridge 64 for simulating the pedal feel.

The cartridge 64 is known to those skilled in the art and we shall therefore not describe it further.

At rest and in a failure situation, the electrically operated valves are open.

The present invention applies in particular to the motor industry.

The present invention applies mainly to the motor vehicle braking industry and in particular to the private car braking industry.

I claim:

1. A master cylinder for a braking system comprising a body (52) pierced with a bore (54) in which there is mounted to slide at least one piston (56) connected by a ball-joint connection to an actuating rod connected to a brake pedal, said piston (56) delimiting a supply chamber (58) connected to a reservoir of brake fluid and a pressure chamber (60) connected to brakes arranged at the wheel, said pressure and supply chambers (58, 60) being in communication at rest and isolated from one another under a braking action, characterized in that said ball-joint connection includes a female element (66) formed an end of the piston (56) and the male element formed on an actuating rod (2), said pressure chamber (60) being connected under normal operation to a cartridge (64) for simulating the pedal feel and in degraded operation is connected to the brakes, said ball-joint being characterized in that:

pegs (30, 30') mounted in an diametral bore (32) of an actuating rod (2) and a spacer element (38) mounted in an longitudinal bore (39) of the actuating rod (2) are in an initial position of minimum separation; and that on insertion in a bore (6) in female element (66) a first end (14) of the actuating rod (2) comes into contact with the wall of the female element (66) such that the spacer element (38) is pushed back inside the longitudinal bore (39) of the actuating rod (2) to bring the pegs (30, 30') into a position of maximum separation and spherical ends (36, 36') on said pegs (30, 30') thereafter collaborate with an interior surface (18) on the female element (66) to lock the actuating rod (2) with the female element (66).

2. An assembly having a ball-joint connection comprising a female element (4) pierced with a bore (6) of longitudinal axis (X), equipped at a longitudinal first end (8) with an end wall having a roughly spherical housing (16) with an inside diameter greater than the diameter of said bore (6) and at a longitudinal second end (12), an opening allowing a male element (2) to be introduced, said male element (2) being formed of a rod equipped having a spherical first longitudinal end (14) able to enter said bore (6) with a transverse dimension smaller than the diameter of the spherical housing (16), characterized in that said first end (14) of the male element (2) includes connecting means (28) to achieve a ball-joint connection between the male element (2) and the female element (4), said connecting means (28) can be automatically extracted radially as said first end (14) of the male element (2) is being mounted in the housing (16) of the female element (4), said connecting means (28) including at least a first peg (30) and a second peg (30') that are mounted to slide in a diametral bore (32) roughly orthogonal to the longitudinal axis (X) and opening to both sides of the first end (14) of the male element, a spacer element (38) mounted to slide in an axial bore (39) that intercepts said diametral bore (32) at a first end and opening to the outside of the male element at a second end, said pegs (30, 30') prior to assembly of the male element (2) and of the female element (4) being located in a position of minimum separation from the longitudinal axis (X), termed the retracted position, and after assembly of the male element (2) and of the female element (4), the spacer element (38) moves said pegs (30, 30') apart into a position of maximum separation termed the deployed position to lock the male element (2) and the female element (4) together in an assembled position.

3. The assembly with a ball-joint connection according to claim 2, characterized in that it also comprises unlocking means for unlocking said assembly, said unlocking means being formed of a passage allowing a tool to simultaneously move the spacer element (38) axially toward the end wall (10) of the housing (16) and move the male element axially toward the second end (12) of the longitudinal bore (8) of the female element (4) so that the pegs (30, 30') readopt their retracted position.

4. The assembly with a ball-joint connection according to claim 2, characterized in that the spacer element (38) is interposed between first ends (34, 34') of the first and second pegs (30, 30'), in that a periphery of the spacer element is shaped as a ramp along the longitudinal axis (X), the ramp increasing in size in the direction from a first end (40) of the spacer element, and in that the first end (40) of the spacer element (38) projects, prior to assembly, from the exterior surface of the spherical first end (14) so that said spacer element is moved axially by the pressing of said longitudinal first end (40) of the spacer element (38) against the interior surface of the housing (40) as the male element (2) is introduced into the female element (4).

5. The assembly with a ball-joint connection according to claim 4, characterized in that the ramp has at least a smaller-diameter first cylindrical portion (42) and a larger-diameter second cylindrical portion (44), said smaller-diameter first portion (42) being arranged between the first ends (34, 34') of the pegs prior to assembly of the male element (2) and of the female element (4), and said larger-diameter second portion (44) being arranged between the first ends of the pegs after assembly of the male element (2) and of the female element (4), and in that a cone frustum connects the first portion (42) to the second portion (44).

6. The assembly with a ball-joint connection according to claim 4, characterized in that the spacer element (38) has a substantially conical shape.

7. The assembly with a ball-joint connection according to claim 5, characterized in that the first end (34, 34') of the pegs (30, 30') is substantially flat and a second end (36, 36') of the pegs (30, 30') is formed by a spherical cup of radius substantially equal to the interior radius of the housing (16) of the female element (4).

8. The assembly with a ball-joint connection according to claim 7, characterized in that the pegs (30, 30') are held in the position of minimum separation by retaining means.

9. The assembly with a ball-joint connection according to claim 8, characterized in that the retaining means are formed of an elastic ring (43) mounted in grooves (45) made in the spherical end (36, 36') of the pegs (30, 30') and in an annular groove (47) connecting the ends of the diametral bore.

10. The assembly with a ball-joint connection according to claim 3, characterized in that said passage is made in the end wall (10) of the spherical housing (16) of the female element facing the longitudinal first end (40) of the spacer element (38).

11. The assembly with a ball-joint connection according to claim 3, characterized in that said passage is made axially in the male element by extending the bore (39) that accommodates the spacer element (38).

* * * * *